No. 673,227. Patented Apr. 30, 1901.
T. R. TIMBY.
APPARATUS FOR SEASONING COFFEE, &c.
(Application filed Apr. 5, 1900.)
(No Model.)
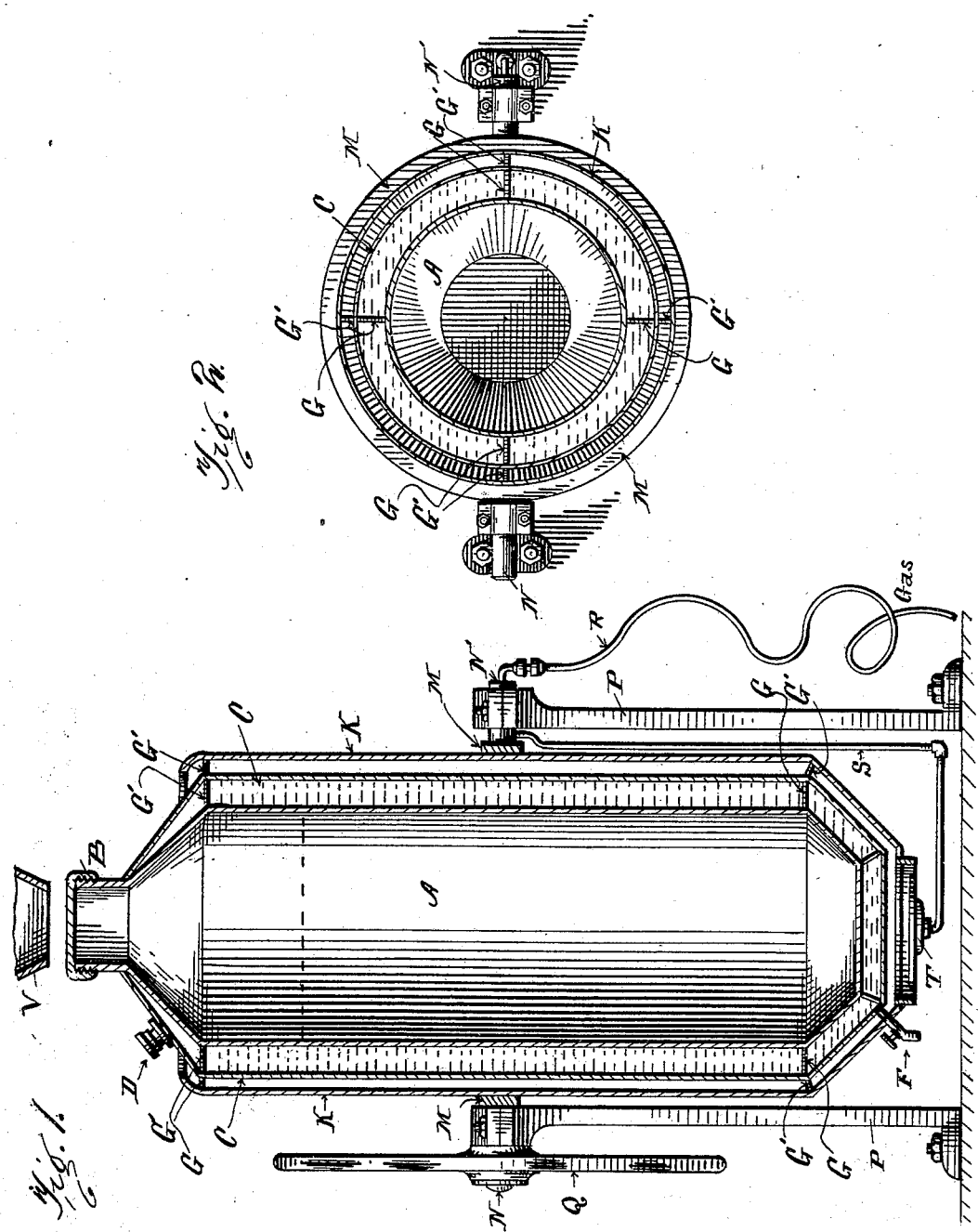
WITNESSES
Charles K. Davies.
M. E. Brown.
INVENTOR
T. R. Timby
By W. H. Bartlett
Attorney

UNITED STATES PATENT OFFICE.

THEODORE R. TIMBY, OF NEW YORK, N. Y.

APPARATUS FOR SEASONING COFFEE, &c.

SPECIFICATION forming part of Letters Patent No. 673,227, dated April 30, 1901.

Application filed April 5, 1900. Serial No. 11,740. (No model.)

*To all whom it may concern:*

Be it known that I, THEODORE R. TIMBY, a citizen of the United States, residing at New York, in the county of New York and State of New York, have invented certain new and useful Improvements in Drying and Tempering Apparatus, of which the following is a specification, reference being had therein to the accompanying drawings.

This invention relates to a machine for producing a drying action and independent fermentation in grain, coffee-berries, malt, and other articles of food.

The object of the invention is to produce a machine or receptacle in which an even temperature may be maintained or within which the temperature may be varied within moderate limits, while permitting a stirring or mixing of the grain, berries, or what not.

Figure 1 is a vertical section, and Fig. 2 a cross-section, of the machine or apparatus.

A indicates a strong metallic vessel having a cover B, which is held on by a screw-thread, as shown. The mouth is large enough to permit the ready entrance and removal of the contents. The vessel A is preferably cylindrical, with truncated conical ends, as shown.

C is a water-jacket or cover surrounding the vessel A and having inlet or opening D and escape-passage F, both of which may be opened or securely closed. Braces G at suitable intervals sustain the outer shell, but permit the free passage of water within the jacket.

K is an external jacket inclosing an air-chamber. The outer jacket is of the same general form as the receptacle, but incloses an air-chamber covering the bottom and sides of the receptacle. Braces G' strengthen the outer jacket.

A central ring or band M surrounds the entire vessel and is securely held thereto. On this band M are trunnions N N', which rest in bearings on standards P, said standards being secured to the floor or otherwise supported.

On one of the trunnions, as N, a hand-wheel Q is mounted, and by turning this wheel the receptacle may be inverted for emptying or may be rotated, so as to mix and stir the contents of vessel A.

A gas-pipe R enters one of the trunnions, and from this pipe a pipe S leads to burner T under the receptacle. The connection of the gas-pipe should be such as to permit the rotation of the receptacle without interference with the gas connection.

The receptacle A can be nearly filled with raw coffee, malt, or other grain or material to be treated through funnel V. The water-chamber should be nearly filled with water. Then by lighting the gas at T the water may be heated to the desired temperature, which is usually less than 150° Fahrenheit, and such temperature may be maintained for several days, if desired. A thermometer may be applied in any convenient manner. The air-chamber prevents rapid radiation of heat. The trunnion connection of the gas-pipe permits the burner to burn in any position of the receptacle.

The receptacle is occasionally turned over during the several days employed in seasoning the grain or material.

What I claim is—

1. A tempering-receptacle for coffee, grain, &c., consisting of a vessel supported on trunnions so as to be readily rotated and having a mouth with suitable cover, a surrounding water-jacket, an air-chamber around the water-jacket, and means for heating the air-chamber.

2. A tempering-receptacle as described consisting of a cylinder mounted on trunnions, a water-jacket around the cylinder and an air-jacket around the water-jacket, and a gas-burner receiving its gas-supply through one of the trunnions.

3. A tempering-receptacle consisting of a cylinder surrounded by a water-jacket and an air-chamber, trunnions supporting the receptacle, a wheel connected to one trunnion to reverse or rotate the receptacle, and a gas-burner under the normal bottom of the receptacle supplied with gas through one of the trunnions, all combined substantially as described.

In testimony whereof I affix my signature in presence of two witnesses.

THEODORE R. TIMBY.

Witnesses:
W. A. BARTLETT,
CHAS. K. DAVIES.